United States Patent [19]

Tang et al.

[11] Patent Number: 4,861,604

[45] Date of Patent: Aug. 29, 1989

[54] SHEETABLE THERMOSTABLE FILLING COMPOSITION

[75] Inventors: Jiunn-Yann Tang, Dallas; Regina A. Brown, North Richland Hills; Victor H. Ke, Grand Prairie, all of Tex.

[73] Assignee: Frito-Lay, Inc., Dallas, Tex.

[21] Appl. No.: 149,085

[22] Filed: Jan. 27, 1988

Related U.S. Application Data

[63] Continuation-in-part of Ser. No. 880,808, Jul. 1, 1986, abandoned.

[51] Int. Cl.$^4$ ............................................. A21D 13/00
[52] U.S. Cl. ........................................ 426/94; 426/103; 426/573; 426/572; 426/576; 426/578; 426/613; 426/274; 426/321
[58] Field of Search .................. 426/94, 576, 578, 613, 426/103, 274, 321, 572

[56] References Cited

U.S. PATENT DOCUMENTS

| | | | |
|---|---|---|---|
| 3,479,90 | 11/1969 | Ganz | 426/570 |
| 2,171,244 | 8/1939 | Otterbacher | 426/572 |
| 2,359,228 | 9/1944 | Lloyd et al. | 426/572 |
| 2,682,472 | 6/1954 | Wagner | 426/572 |
| 2,992,188 | 7/1961 | Miller et al. | 426/96 |
| 2,992,925 | 7/1961 | Green et al. | 426/573 |
| 3,198,637 | 8/1965 | Harris et al. | 426/94 |
| 3,586,513 | 6/1971 | Horn et al. | 426/572 |
| 3,666,493 | 5/1972 | Bluemke | 99/139 |
| 3,669,688 | 6/1972 | Thompson | 99/139 |
| 3,687,690 | 8/1972 | Moore | 426/572 |
| 3,833,741 | 9/1974 | Katz | 426/94 |
| 4,120,987 | 10/1978 | Moore | 426/572 |
| 4,146,652 | 3/1979 | Kahn et al. | 426/564 |
| 4,232,049 | 11/1980 | Blake | 426/572 |
| 4,251,562 | 2/1981 | Le Grand et al. | 426/573 |
| 4,254,156 | 3/1981 | De Socio et al. | 426/565 |
| 4,312,891 | 1/1982 | Eisfeldt | 426/573 |
| 4,388,337 | 6/1983 | Cawdron | 426/578 |
| 4,444,799 | 4/1984 | Vanderveer et al. | 426/549 |
| 4,518,622 | 5/1985 | Wilson et al. | 426/578 |
| 4,610,884 | 9/1986 | Lewis, III et al. | 426/103 |
| 4,612,198 | 9/1986 | Wallin et al. | 426/94 |
| 4,622,226 | 11/1986 | Ke et al. | 426/94 |
| 4,623,542 | 11/1976 | Wallin et al. | 426/94 |
| 4,636,397 | 1/1987 | Brown et al. | 426/579 |
| 4,670,272 | 6/1987 | Chen et al. | 426/94 |
| 4,752,494 | 6/1988 | Tang et al. | 426/573 |

*Primary Examiner*—Jeanette Hunter
*Attorney, Agent, or Firm*—Bernard, Rothwell & Brown

[57] ABSTRACT

A sheetable, thermostable filling composition capable of being baked to a crisp texture is produced by a method which comprises: dispersing gelatin and maltodextrin in water at a temperature of at least 140° F.; and adding a pregelled starch.

10 Claims, No Drawings

SHEETABLE THERMOSTABLE FILLING COMPOSITION

CROSS-REFERENCE TO RELATED APPLICATIONS

This application is a continuation-in-part of U.S. Ser. No. 880,808, filed July 1, 1986, now abandoned.

BACKGROUND OF THE INVENTION

2. Field of the Invention

This invention relates to the production of edible filling materials for use in filled baked products such as pastries, crackers and cookies. More particularly, it relates to the production of filling materials which are thermostable and sheetable, so that they can be applied in layers to unbaked dough and then baked together with the dough.

2. Prior Art

Ready-to-eat baked goods containing filling materials such as cheese-flavored fillings, cremes and the like generally have exhibited short shelf lives. The short shelf lives of these products are caused primarily by the high water contents and high water activities of the filling materials. The water activity ($A_w$) of a food is defined as the partial vapor pressure of water in the food divided by the saturation vapor pressure of pure water at the temperature of the food. It can be measured by placing a sample of the product to be tested in a container, which is then sealed, and determining the relative humidity above the sample after equilibrium is reached. Water activity can be considered to be a measure of the tendency of the material to allow water to migrate out of the material to its surrounding environment.

The relatively high water activities associated with prior art filling materials are problematical in several respects. When the filling material is in contact with a material of lower water activity, such as a baked dough, moisture tends to migrate from the filling material into the baked dough, making the baked dough portion soggy. Moreover, filling materials having high water activities provide a medium which is conducive to microbial growth.

For the foregoing reasons, it would be desirable to produce filling materials having relatively low water activities. In the past, filling materials having relatively low water activities have been produced by the addition of various humectants to the filling material formulations. The materials produced in this manner, however, have generally not been thermostable. Consequently, they could not be applied to a dough product prior to baking.

SUMMARY OF THE INVENTION

This invention provides thermostable filling compositions having low water activities. The filling compositions can be applied to unbaked dough products and baked, together with the dough, to form shelf-stable filled bakery products. They have the unusual property of being sheetable at room temperature; that is, they can be rolled out to form a cohesive sheet at thicknesses as low as 1.0 mm. The property of sheetability, which normally is not present in comestible products that are devoid of flour, makes the composition particularly easy to handle and well suited to making laminated baked goods containing alternating layers of baked dough and filling material. Upon baking, the filled products exhibit water activities below about 0.45.

In one embodiment of the invention, there is provided a method for producing a sheetable, thermostable filling composition, which is capable of being baked to a crisp texture, the method comprising:

(a) dispersing gelatin and maltodextrin in water at a temperature of at least 140° F.; and (b) adding a pregelled starch to the gelatin, maltodextrin and water.

In another embodiment of the invention, there is provided a method of producing a filled bakery product having extended shelf life in which the filling composition produced by the procedure described above is sheeted and a laminate is formed which comprises alternate layers of sheeted dough and the sheeted filling composition. The laminate is baked, preferably until the moisture content of the filled product is from about 2.0% to 3.5%.

DETAILED DESCRIPTION OF THE PREFERRED EMBODIMENTS

The initial step in the production of the filling compositions of the invention is the dispersion of gelatin and maltodextrin in water at a temperature of at least about 140° F. Type A gelatin, i.e., gelatin derived from acid processed collagen usually obtained from porkskins, is preferred. The bloom strength of the gelatin employed is preferably from about 200–250. The gelatin is preferably employed in an amount from about 2% to about 3% of the total weight of the filling composition.

Maltodextrins, as those skilled in the art are aware, are partial hydrolyzates of starches. While the maltodextrin used in the invention may be derived from any known food starch, maltodextrins derived from corn starch are preferred. Maltodextrins can be classified on the basis of dextrose equivalent (D.E.) values. The term "D.E." refers to the reducing sugars content of the starch hydrolyzates expressed as percent dextrose as measured by the Luff- Schoorl method (NBS Circular C-40, page 195 as appearing in "Polarimetry Saccharimetry, and the Sugars" by Frederick J. Bates and Associates). The maltodextrins are distinguished from corn syrups, which have higher D.E. values. In general, starch hydrolyzates having D.E. values below about 20 are suitable for use as the maltodextrin in the invention. Preferably, the maltodextrin has a D.E. value from about 10 to about 20. The D.E. value selected will affect the final properties of the baked filling. Generally, a lower D.E. maltodextrin will result in a more crispy filling.

The maltodextrin is preferably employed in an amount from about 35% to about 45% of the total weight of the filling composition.

The gelatin and maltodextrin are preblended and the water is then added. The water is preferably added in an amount from about 20% to about 25% of the total weight of the filling composition. It is to be understood that weight percentages given herein are based on the weight of the filling composition before baking inasmuch as baking drives off a portion of the water. Preferably, the water is added at a temperature from about 140° F. to about 160° F. The gelatin and maltodextrin can be preblended, mixed with the water at 140°–160° F. A pregelled starch is then added to the mixture. The order in which the pregelled starch is added is critical to the obtainment of the desired properties in the filling composition. If the gelatin and maltodextrin are not added to the water prior to addition of the pregelled starch, the latter will take up an inordinate amount of the water so that there will be an inadequate amount of water left to interact with the gelatin and the maltodextrin.

The pregelled starch used in the composition of this invention may be crosslinked or noncrosslinked. The pregelled starch may contain either a high or low concentration of amylose. The pregelled starch employed in the method of the invention preferably contains at least about 50% amylose and most preferably between about 50% and about 55% amylose, or approximately twice as much amylose as in ordinary corn starch. Pregelled starches of this type are commercially available. One such starch is available under the tradename National 780099 (National Starch Corp.). Pregelled starches which have a lower amylose content may also be used. Starch No. 5, sold by Midwest Grain Products, is an example of this type of starch which can be used in the method of this invention. The pregelled starch is preferably added to the composition in an amount from about 5% to about 20%, based on the total weight of the composition.

Advantageously, a fat and an emulsifier are also added to the composition in order to improve the texture, or "mouthfeel," of the filling composition and handling characteristics (less sticky). The fat and emulsifier can be added to the composition concurrently with the pregelled starch. The fat can be high in unsaturation or can be a saturated fat. Unsaturated fats (including safflower oil, sunflower oil, cottonseed oil, soybean oil and corn oil) give a softer texture to the creme. The saturated fats that can be used include the hydrogenated oil products of coconut, olive, corn, cottonseed, peanut, etc. The fat is generally added to the composition in an amount from about 3% to 5% of the total weight of the filling composition.

Suitable emulsifiers include lecithin and mono- and diglycerides, such as monostearin and monopalmitin.

Many blends of emulsifiers are commercially used and readily available. For example, it may be desirable to provide a controlled hydrophilic-lypophilic balance (HLB) as with a lypophilic emulsifier such as glyceryl monostearate or sorbitan monostearate with a hydrophilic material such as polysorbate 60. When a blend of emulsifiers is used, the HLB value should be from about 8 to about 13 because this range is more hydrophilic and form oil in water emulsions. HLB values from 1 to 8 should be avoided since this range is more lypophilic and would provide undesirable properties to the product. A particularly preferred emulsifier is lecithin. The emulsifier is present in an amount from about 0.05% to about 0.15%, of the total weight of the filling composition.

Advantageously, the emulsifiers, e.g., mono-glycerides and/or lecithin, are added to the composition concomitantly with the dispersion of the gelatin and maltodextrin in water. The monoglycerides are believed to complex with the pregelled starch to impart improved handling properties to the composition.

Conventional flavoring agents can be added to the composition in amounts which are effective to impart the desired flavors. Flavoring agents can comprise up to about 30% of the total weight of the filling composition. One can mention, as merely exemplary of the flavoring agents which can be employed, cheese powder, sour cream and onion, bacon and cheese, cheddar and nacho flavorings.

The filling compositions produced by the foregoing method are thermostable at baking temperatures and do not exhibit "boil-out" during baking. The finished product containing the filling composition generally has water activity in the range of about 0.2 to 0.45. The composition can be sheeted down to about 1.0 mm without tearing. It is particularly well suited for use in forming laminated baked goods. In a preferred embodiment, the composition is sheeted to a thickness of about 1.0 mm and sandwiched in a puff pastry dough. The laminate is then baked to produce a flaky pastry with a crispy filling. The filling composition can also be employed in other forms of baked products. For example, it can be used with appropriate flavoring agents in the form of a cheese spread or filling for pre-bake application to crackers. Preferably, the filled bakery product is baked until the moisture content of the finished product is from about 2.0% to about 3.5%.

The following examples are intended to illustrate further the practice of the invention and they are not intended to limit its scope in any way.

EXAMPLE I

A cheese-flavored filling composition was produced from the following ingredients:

| Ingredient | Wt. % | Grams |
|---|---|---|
| Gelatin (Type A, Bloom strength 225) | 2.38 | 47.6 |
| Maltodextrin (D.E. 10) | 39.70 | 794.1 |
| Water | 22.13 | 442.8 |
| Lecithin | 0.06 | 1.2 |
| Myverol (monoglyceride emulsifier) | 0.06 | 1.2 |
| Pregelled starch (National 780099) | 11.90 | 238.0 |
| Flavoring agents: | | |
| Low lactose nacho flavor | 19.06 | 381.2 |
| Salt | 2.09 | 41.8 |
| Yeast extract | 0.50 | 10.0 |
| Butter popcorn flavor | 1.50 | 30.0 |
| McCormick cream | 0.02 | 0.3 |
| Smoked pork flavor | 0.30 | 6.0 |
| Cilantro-dextrose carrier | 0.10 | 2.0 |
| Artificial tomato flavor | 0.20 | 4.0 |
| Total | 100.00 | 2,000.0 |

The gelatin, maltodextrin, lecithin and Myverol were blended. The water (140° F.) was added and the ingredients were mixed, using a Hobart TM laboratory mixer, for 2 minutes at speed #1 and 30 seconds at speed #2. The pregelled starch and the flavoring agents were then added and the ingredients were mixed for an additional 1½ min. at speed #1.

The filling composition was sheeted to 1.0 mm and sandwiched between two layers of puff pastry dough (1.5 mm). The sandwiched product was then reduced in thickness to 1.5 mm. The product was cut, docked and baked for 9 minutes. The resulting product had a flaky pastry texture with a crisp filling.

EXAMPLE II

A cheese-flavored filling was prepared from the following ingredients:

| Ingredient | Wt. % |
|---|---|
| Gelatin (Type A, Bloom strength 225) | 2.38 |
| Maltodextrin (D.E. 10) | 38.00 |

-continued

| Ingredient | Wt. % |
| --- | --- |
| Water | 19.00 |
| Lecithin | 0.06 |
| Myverol (monoglyceride emulsifier) | 0.06 |
| Pregelled starch (National 780099) | 11.80 |
| Cheese flavorings | 23.70 |
| Shortening, liquid | 5.00 |
| Total | 100.00 |

The gelatin, maltodextrin, lecithin and Myverol were blended. The water (140° F.) was added and the ingredients were mixed, using a Hobart TM laboratory mixer, for 2 minutes. The pregelled starch and cheese flavors were added and the ingredients were mixed for an additional 2 minutes. The liquid shortening was added and the ingredients were mixed for an additional 1 minute.

The filling composition was sheeted to 1.0 mm and sandwiched between two layers of puff pastry dough (1.5 mm). The sandwiched product was then reduced in thickness to 1.5 mm. The product was cut, docked and baked for 9 minutes. The resulting product had a flaky pastry texture with a crisp filling.

What is claimed is:

1. A method for producing a sheetable, thermostable filling composition, which is capable of being baked to a crisp texture, the method comprising:
   (a) dispersing gelatin in an amount from about 2% to about 3% of the total weight of the composition and maltodextrin in an amount from about 35% to about 45% of the total weight of the composition in water in an amount from about 20% to about 25% of the total weight of the composition at a temperature of at least 140° F.; and
   (b) adding a pregelled starch in an amount from about 5% to about 20% of the total weight of the composition and an emulsifier to the mixture of gelatin, maltodextrin and water.

2. A method as claimed in claim 1, wherein a fat is added to the mixture of gelatin, maltodextrin and water.

3. A method as claimed in claim 1, wherein the pregelled starch contains between about 50% and 55% amylose.

4. A method as claimed in claim 1, wherein flavoring agents are also added to the gelatin, maltodextrin and water in an amount up to about 30% of the total weight of the composition.

5. A method of producing a filled bakery product having extended shelf life, the method comprising:
   (a) dispersing gelatin in an amount from about 2% to about 3% of the total weight of the filling composition and maltodextrin in an amount from about 35% to about 45% of the total weight of the filling composition in water in an amount from about 20% to about 25% of the total weight of the filling composition at a temperature of at least 140° F.;
   (b) adding a pregelled starch in an amount from about 5% to about 20% of the total weight of the filling composition, and an emulsifier and a flavoring agent in an amount up to about 30% of the total weight of the filling composition to the mixture of gelatin, maltodextrin and water;
   (c) sheeting the composition formed in steps (a) and (b);
   (d) forming a sandwich comprising a layer of the sheeted composition obtained in step (c) interposed between two layers of sheeted dough:
   (e) sheeting the sandwich produced in step (d); and
   (f) baking the sheeted sandwich.

6. A method as claimed in claim 5, wherein a fat is added to the mixture of gelatin, maltodextrin and water.

7. A method as claimed in claim 5, wherein the pregelled starch contains between about 50% and 55% amylose.

8. A method as claimed in claim 5, wherein the sheeted sandwiched product is baked until the filled product has a moisture content from about 2% to about 3.5%.

9. A sheetable, thermostable filling composition which is produced by the method comprising:
   (a) dispersing gelatin in an amount from about 2% to about 3% of the total weight of the composition and maltodextrin in an amount from about 35% to about 45% of the total weight of the composition in water in an amount from about 20% to about 25% of the total weight of the composition at a temperature of at least 140° F.; and
   (b) adding a pregelled starch in an amount from about 5% to about 20% of the total weight of the composition and an emulsifier to the mixture of gelatin, maltodextrin and water.

10. A filled bakery product which is produced by the method comprising:
   (a) dispersing gelatin in an amount from about 2% to about 3% of the total weight of the composition and maltodextrin in an amount from about 35% to about 45% of the total weight of the composition in water in an amount from about 20% to about 25% of the total weight of the composition at a temperature of at least 140° F.;
   (b) adding a pregelled starch in an amount from about 5% to about 20% of the total weight of the composition, an emulsifier and a flavoring agent in an amount up to about 30% of the total weight of the filling composition to the mixture of gelatin, maltodextrin and water;
   (c) sheeting the composition formed in steps (a) and (b);
   (d) forming a sandwich comprising a layer of the sheeted composition obtained in step (c) interposed between two layers of sheeted dough;
   (e) sheeting the sandwich produced in step (d); and
   (f) baking the sheeted sandwich.

* * * * *